US010338996B2

(12) United States Patent
Martinez et al.

(10) Patent No.: US 10,338,996 B2
(45) Date of Patent: Jul. 2, 2019

(54) PIPELINED DECODER AND METHOD FOR CONDITIONAL STORAGE

(71) Applicants: Vincent Pierre Martinez, Castres (FR); Volker Dietmar Wahl, Toulouse (FR)

(72) Inventors: Vincent Pierre Martinez, Castres (FR); Volker Dietmar Wahl, Toulouse (FR)

(73) Assignee: NXP USA, Inc., Austin, TX (US)

( * ) Notice: Subject to any disclaimer, the term of this patent is extended or adjusted under 35 U.S.C. 154(b) by 347 days.

(21) Appl. No.: 14/753,136

(22) Filed: Jun. 29, 2015

(65) Prior Publication Data

US 2016/0218830 A1 Jul. 28, 2016

(30) Foreign Application Priority Data

Jan. 27, 2015 (WO) .................. PCT/IB2015/000336

(51) Int. Cl.
*H03M 13/00* (2006.01)
*G06F 11/10* (2006.01)
*H04L 1/00* (2006.01)
*H04L 1/18* (2006.01)

(52) U.S. Cl.
CPC ........ *G06F 11/1004* (2013.01); *H04L 1/0041* (2013.01); *H04L 1/0045* (2013.01); *H04L 1/1841* (2013.01); *H04L 1/1845* (2013.01); *H04L 1/1812* (2013.01)

(58) Field of Classification Search
CPC ... H04L 1/1819; H04L 1/1812; H04L 1/1845; H04L 1/0057; H04L 1/0071; H04L 1/1841; H04L 1/0041; H04L 1/0045; G06F 11/1004
USPC .......................................................... 714/751
See application file for complete search history.

(56) References Cited

U.S. PATENT DOCUMENTS 5,606,569 A * 2/1997 MacDonald .......... H03M 13/09 714/758
7,916,719 B2 3/2011 Roh et al.
8,411,778 B1 * 4/2013 Lee .......................... H04L 1/08 370/203
8,595,605 B2 11/2013 Wilborn et al.
8,675,754 B1 * 3/2014 Yonge, III ............ H04L 27/183 375/261
9,094,248 B2 * 7/2015 Onggosanusi ............ H04L 1/06
2003/0126551 A1 * 7/2003 Mantha .............. H03M 13/1102 714/790
2008/0224889 A1 * 9/2008 Wyk ...................... G01D 4/004 340/870.01
2009/0031185 A1 * 1/2009 Xhafa .................. H04L 1/0013 714/751
2009/0059801 A1 3/2009 Garrett et al.
2009/0175205 A1 * 7/2009 Mathew .............. G06F 15/7842 370/281

(Continued)

*Primary Examiner* — Samir W Rizk
*Assistant Examiner* — Enam Ahmed

(57) ABSTRACT

A pipelined decoder for storaging of soft bits and hard bits associated with code blocks of a transmission.
The proposed circuit reduces the amount of memory needed at the receiver level for soft bits and hard bits, in a pipelined decoder. Namely, with the solution of the subject application, both the LLRs and hard bits associated with a given code block are available when the CRC value is determined. Hence, the effect obtained non-pipelined decoder is achieved by the pipelined decoder of the subject application. A receiver for a wireless communication system, a method and a computer program are also disclosed.

16 Claims, 4 Drawing Sheets

100

(56) References Cited

U.S. PATENT DOCUMENTS

| | | | | |
|---|---|---|---|---|
| 2010/0158153 | A1* | 6/2010 | Shimizu | H04B 7/0413 375/286 |
| 2011/0154143 | A1 | 6/2011 | Eckert | |
| 2011/0231725 | A1* | 9/2011 | Gotman | H04L 1/1845 714/748 |
| 2012/0066562 | A1* | 3/2012 | Riess | H03M 13/6306 714/751 |
| 2012/0300692 | A1* | 11/2012 | Sfar | H04B 7/15521 370/315 |
| 2014/0241269 | A1* | 8/2014 | Smee | H04W 72/042 370/329 |
| 2014/0310578 | A1* | 10/2014 | Kwon | H04L 1/005 714/776 |
| 2015/0109996 | A1* | 4/2015 | Lee | H04L 1/1825 370/328 |
| 2016/0119105 | A1* | 4/2016 | Jiang | H04L 5/0055 370/329 |

* cited by examiner

PIPELINED DECODER AND METHOD FOR CONDITIONAL STORAGE

CROSS REFERENCE TO RELATED APPLICATION(S)

The present application claims priority to International Patent Application No. PCT/IB2015/000336, entitled "PIPELINED DECODER AND METHOD FOR CONDITIONAL STORAGE," filed on Jan. 27, 2015, the entirety of which is herein incorporated by reference.

FIELD OF THE INVENTION

This invention relates to a pipelined decoder, a receiver for a wireless communication system, a method and a computer program for storaging of soft bits and hard bits associated with code blocks of a transmission.

BACKGROUND OF THE INVENTION

In modern mobile communication systems such as High-Speed Downlink Packet Access (HSDPA), High-Speed Uplink Packet Access (HSUPA) and Long Term Evolution (LTE), Hybrid Automatic Repeat Request (HARQ) is used in order to guarantee transmission reliability and increase the channel throughput. HARQ is a powerful combination of Forward Error Correction (FEC), error detection and, if necessary, packet retransmission with Automatic Repeat Request (ARQ) for high channel throughput when feedback is available. In HARQ, when a message is not decoded correctly upon reception, valuable information can be stored temporarily and combined with a subsequent or successive retransmission to correctly decode it. However, in order to implement such scenario, the receiver is required to reserve a certain amount of memory for storing all the erroneous packets or transport blocks (TB) of the message to be combined with the retransmissions of the message. Each TB is formed by a number of independent code blocks (CB). The combination of the TBs is done at soft bit level, which is based on posterior probabilities of the bits that were transmitted. Soft bits are usually stored in the form of log-likelihood ratios (LLRs). Further, in HARQ, when a message is decoded correctly upon reception, the resulting decoded data need be stored by the receiver for use at upper layers of the protocol stack. Due to the ever increasing data rates in the mobile communication systems and the need for supporting multiple HARQ processes in parallel, LLRs storage and decoded data storage are bound to require an increasing amount of memory.

Document (1) U.S. Pat. No. 8,595,605 discloses a method and a wireless communication device for reducing the number of LLRs stored in the local memory. In document (1), where a CB succeeds a cyclic redundancy check (CRC), the decoded CB is stored in a local memory. However, where a CB fails the CRC, the LLRs associated with the CB are only stored in the local memory if a given quality metric is reached. Otherwise, where the given quality metric is not reached, the associated LLRs are stored in an external memory such as a double data rate (DDR) memory attached to the demodulator of the receiver.

It is clear from document (1), that such solution is appropriate where the wireless communication device uses a non-pipelined architecture, in which only one CB is processed at a time. In fact, in the solution of document (1), a CB is sequentially processed by a decoder until the corresponding CRC is obtained so as to determine whether to store the decoded CB in case of CRC success or the associated LLRs in case of CRC failure. This solution cannot work, as such, in pipelined architectures where the HARQ combining operation and the FEC decoding operation are performed concurrently on different stages. For instance, in the case where pipelined architecture is used, the HARQ combining operation and the FEC decoding operation may be performed on different CBs at the same time. Hence, for instance, where FEC decoding operation is performed on a given CB, there is performed at the same time HARQ combining operation on the subsequent CB. Therefore, in case of CRC failure at the end of the FEC decoding operation, it is too late to retrieve the associated LLRs for storage, because the HARQ combining operation may have overwritten them with the LLRs associated with the subsequent CB being currently processed.

Accordingly, the prior art solutions described in document (1) suffers from a high amount of memory and data traffic needed at the receiver level for both foregoing type of storages, in a pipelined decoder.

SUMMARY OF THE INVENTION

The present invention provides a pipelined decoder, a receiver for a wireless communication system, a method and a computer program as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

For the sake of understanding of the subject application, the following detailed description will focus on a pipelined Physical Uplink Shared Channel (PUSCH) decoder such as those commonly used in receivers of the Long Term Evolution (LTE) communication system at the eNodeB level. However, persons skilled in the art of communication systems will readily appreciate that the proposed solution may also apply to a pipelined Physical Downlink Shared Channel (PDSCH) decoder such as those commonly used in receivers of the LTE communication system at the UE level. Furthermore, it is also contemplated other communication systems different from LTE communication system, where those other communication systems comprise receivers having pipelined decoders exhibiting the same characteristics as those described thereinafter.

Figure 1:
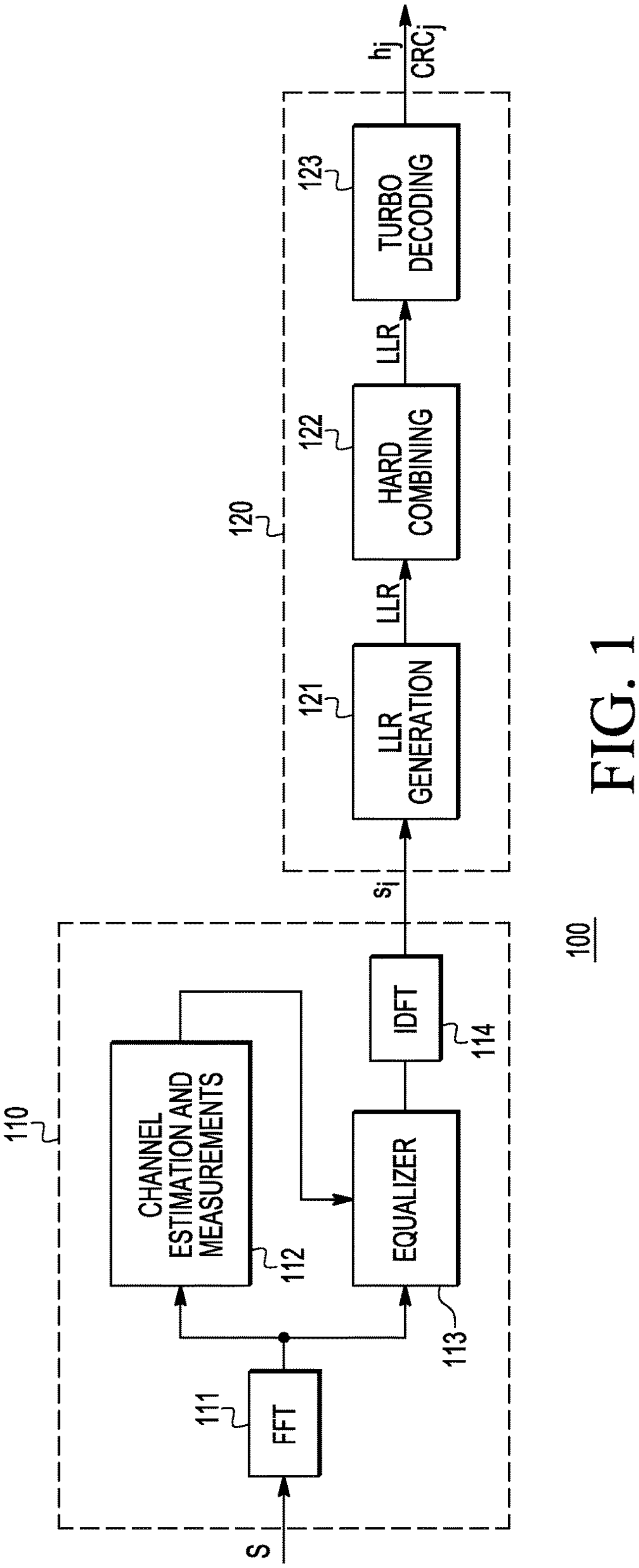
FIG. 1 is a schematic diagram of a Hybrid Automatic Repeat Request (HARQ) receiver.

First, for the sake of clarity, it will be described the architecture of a PUSCH receiver such as the wireless receiver 100 illustrated in FIG. 1. In the example of FIG. 1, the receiver 100 is implemented in a wireless communication device such as an eNodeB (not shown). The receiver 100 comprises a demodulator 110 which receives a data transmission signal S comprising a plurality of code blocks and outputs symbols s_i associated with each code block of the data transmission signal S. The data transmission signal S may be a baseband signal. The demodulator 110 comprises a Cyclic Prefix (CP) removing unit (not shown) which removes the cyclic prefix from the transmission signal S and inputs the resulting signal into a Fast Fourier Transform (FFT) unit 111 for conversion from the time domain into the frequency domain. The demodulator 110 also comprises a channel estimation and measurement unit 112 for performing channel estimation, time and frequency offset estimations, Doppler speed and noise estimations based on the frequency domain signal. The demodulator 110 further comprises an equalizer unit 113 for performing channel correction to the frequency-domain signal. Channel correction may be based on the estimation of Carrier Frequency Offset (CFO). Further, the demodulator 110 also comprises an inverse discrete Fourier transform (IDFT) unit 114, which is operably coupled to the equalizer unit 113 and which converts the frequency-domain signal from the frequency domain into pseudo time domain, thereby generating the symbols s_i. The term "pseudo time domain" is used in lieu of "time domain" because the combination of the FFT unit 11 and the IDFT unit 114 do not have the same size and do not operate on the same data. In certain embodiment, an inverse FFT unit (not shown) is used instead of the IDFT unit 114. The symbols s_i may be IQ symbols. The symbols s_i are then de-interleaved and arranged into code blocks, for the next processing stage.

The receiver 100 further comprises a PUSCH decoder 120 operably coupled to the demodulator 110. The decoder 120 receives and converts symbols s_i, associated with a code block CB_j, into hard bits h_j. The decoder 120 comprises a Log-Likelihood Ratio (LLR) computing unit 121 for computing LLR values (i.e. soft bits) for each symbol s_i. In an example, the LLR computing unit 121 is a QAM-demodulator/demapper arranged, for instance, to convert one symbol s_i into two soft bits for QPSK modulation, into four soft bits for 16QAM modulation and/or into six soft bits for 64QAM modulation. A soft bit should be understood as being a representation of a code block received at the receiver 100 and which includes data and associated information that indicates a level of confidence in the data. For example, a soft bit can represent a bit of code block with a +1 or −1 and an associated confidence level that indicates the likelihood that the received bit of the code block is actually equal to the +1 or −1.

The decoder 120 also comprises a Hybrid Automatic Repeat Request (HARQ) combining unit 122 operably coupled to the LLR computing unit 121 for combining the LLR values associated with a code block of the current transmission with LLR values of previous transmissions of unsuccessfully decoded code blocks. The decoder 120 further comprises a FEC decoding unit such as a turbo decoding unit 123 operably coupled to the HARQ combining unit 122 for decoding the soft bits into the hard bits h_j associated with the code block. Further, the FEC decoding unit 123 also provides a cyclic redundancy check (CRC) value CRC_j of the hard bits h_j associated with the code block CB_j.

Secondly, focus will be put on the architecture of the decoder 120. As stated earlier, the decoder 120 may be implemented following a non-pipelined architecture as it is the case in document (1). Basically with such architecture, the decoder 120 processes data associated with one code block of a transmission at a time. This is why in document (1), the code block CRC can be obtained at the output of the FEC decoding unit 123 so as to determine whether to store the decoded code block in case of CRC success or the associated LLRs in case of CRC failure. In other words, when the FEC decoding operation finishes for a given code block, the associated LLRs generated by the HARQ combining unit are still available, so that they can be stored in an external memory of the decoder 120.

However, this is not so the case where the decoder 120 uses a pipelined architecture. Thereinafter, it will be considered that the decoder 120 uses a two-stage pipelined architecture, wherein the first stage comprises the LLR computing unit 121 and the HARQ combining unit 122 and the second stage comprises the FEC decoding unit 123. The first stage and the second stage are concurrently operated on soft bits associated with different code blocks of a transmission. For instance, let's consider the data transmission signal S of FIG. 2 which comprises two code blocks CB_1 and CB_2 and let's describe a time evolution of the two-stage pipelined decoder 120 while processing the two code blocks CB_1 and CB_2 as illustrated in FIG. 3.

Figure 3:
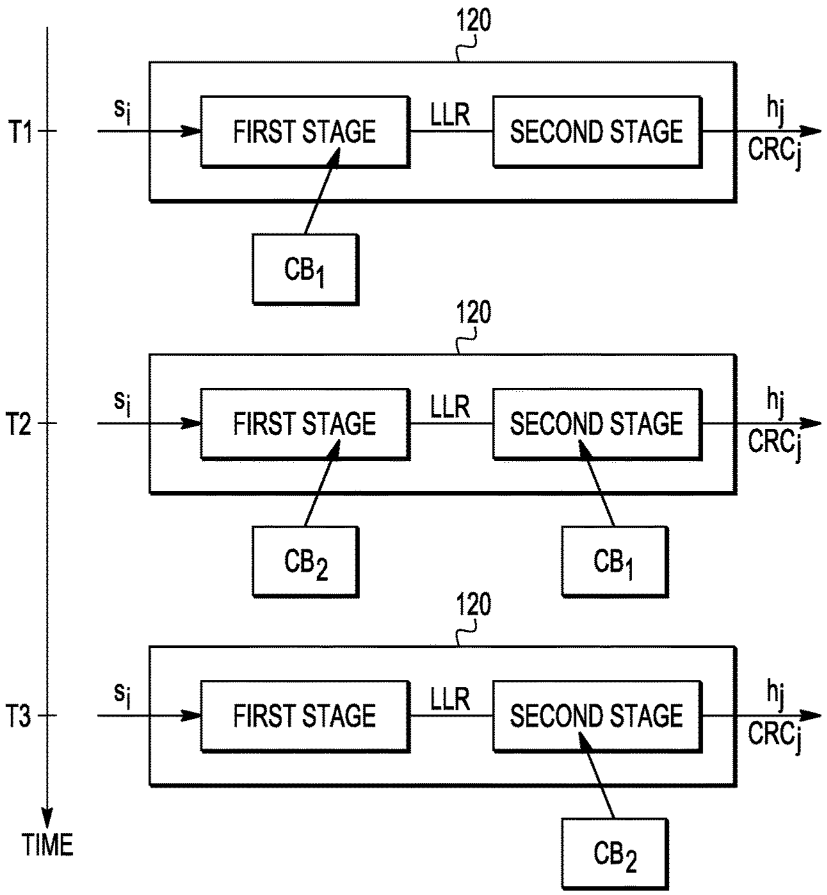
FIG. 3 is a time evolution of a two-stage pipelined decoder while processing the data transmission signal of FIG. 2.

In the example of FIG. 3, at time T1, code block CB_1 is processed by the first stage of the pipelined decoder 120 while no code block is processed by the second stage of the pipelined decoder 120. At time T2, code block CB_2 is processed by the first stage of the pipelined decoder 120 while, at the same time, code block CB_1 is processed by the second stage of the pipelined decoder 120. As can be readily understood, at time T2, the LLRs produced by the first stage of the pipelined decoder 120 are associated with code block CB_2 while the CRC value CRC_j of the hard bits h_j produced by the second stage of the pipelined decoder 120 are associated with code block CB_1. Hence, applying the teachings of document (1) in the pipelined decoder 120 would not work. Indeed, in case where code block CB_1 fails the CRC test, it won't be possible to store the LLRs associated with code block CB_1 since they would have been overwritten by the LLRs associated with code block CB_2. Later, at time T3, no code block is processed by the first stage of the pipelined decoder 120 while code block CB_2 is processed by the second stage of the pipelined decoder 120. In one embodiment, the LLR computing unit 121 and the HARQ combining unit 122 are comprised in a single module. In another embodiment, the LLR computing unit 121 is not part of the decoder 120, but part of the demodulator 110. In that case, the first stage of the decoder 120 only comprises the HARQ combining unit 123.

To summarise, from the foregoing it can be readily appreciated that the teachings of document (1) are not appropriate for a decoder having a pipelined architecture such as the two-stage pipelined decoder 120 illustrated in FIG. 3.

In order to solve the above-mentioned problem, it is proposed to store the soft bits produced by the first stage of a pipelined decoder into a cyclically selected one of a first, second and third memory locations of the pipelined decoder. Further, it is proposed to decode soft bits based on the previous cyclically selected memory location.

Figure 4:
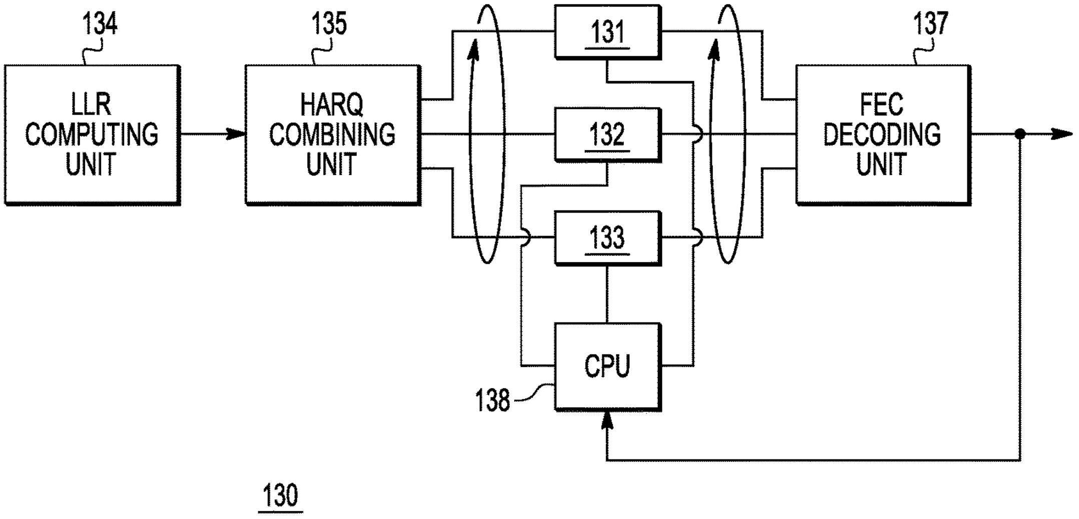
FIG. 4 is a pipelined decoder according to embodiments of the subject application.

Referring now to FIG. 4, there is diagrammatically shown therein an exemplary pipelined decoder 130 in accordance with embodiments of the subject application. The pipelined decoder 130 may be arranged to replace the decoder 120 in the receiver 100 of FIG. 1. In FIG. 4, the pipelined decoder 130 comprises:

- a first memory location 131, second memory location 132 and a third memory location 133, each being arranged to store information associated with one received code block of a transmission signal;
- a Log-Likelihood Ratio (LLR) computing unit 134 arranged to provide soft bits based on a received code block of the transmission signal;
- a Hybrid Automatic Repeat Request (HARQ) combining unit 135 arranged to:
  - combine the soft bits with a retransmission of the received code block; and,
  - store the combined soft bits into a cyclically selected one of the first, second and third memory locations 131, 132, 133;
- a Forward Error Correction (FEC) decoding unit 137 arranged to:
  - decode combined soft bits into hard bits based on the previous cyclically selected memory location; and,
  - provide a cyclic redundancy check (CRC) value of the hard bits;
- a processing unit 138, such as a processor, arranged to store in an external memory:
  - the combined soft bits of the previous cyclically selected memory location when the CRC value is representative of a CRC failure; and,
  - the hard bits when the CRC value is representative of a CRC success.

Figure 2:
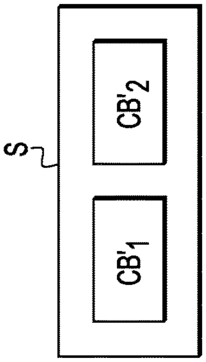
FIG. 2 is an example of a data transmission signal received by the receiver of FIG. 1.

In FIG. 4, the HARQ combining unit 135 and FEC decoding unit 137 are concurrently operated on soft bits associated with different code blocks of the transmission signal, as already explained with regards to FIGS. 2-3. Further, in FIG. 4, the HARQ combining unit 135 is operably coupled to the LLR computation unit and to the first, second and third memory locations 131, 132, 133. The latter memory locations 131, 132, 133 are operably coupled to the FEC decoding unit 137 and to the processing unit 138. The processing unit 138 is further operably coupled to the FEC decoding unit 137.

Figure 5:
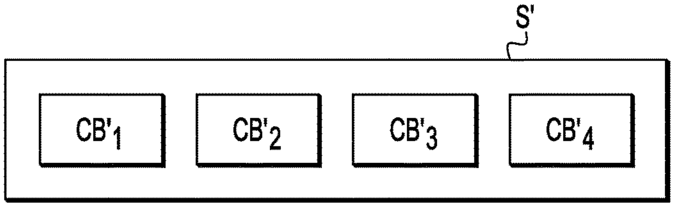
FIG. 5 is another example of a data transmission signal received by the receiver of FIG. 1.
Figure 6:
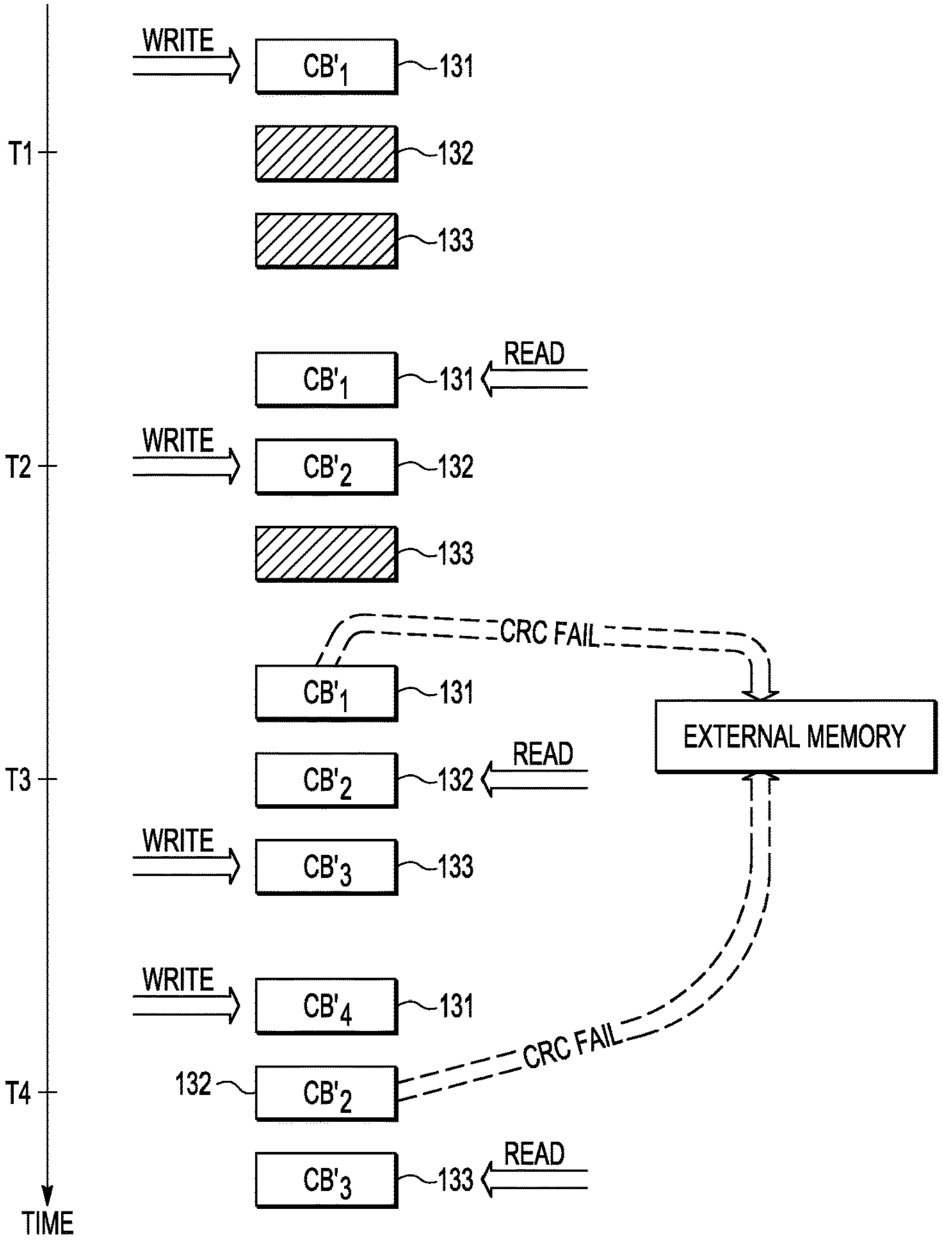
FIG. 6 is a time evolution of the memory locations of the pipelined decoder of FIG. 4 while processing the data transmission signal of FIG. 5

Referring now to FIGS. 5-6, there will be described the pipelined decoder 130 of FIG. 4 while being in operation. In FIG. 5, there is diagrammatically shown therein a data transmission signal S' comprising a plurality of code blocks. In FIG. 6, there is diagrammatically shown therein a time evolution of the memory locations 131, 132, 133 of the pipelined decoder 130 while processing the data transmission signal S'.

In FIG. 6, at time T1, code block CB'_1 is processed by the HARQ combining unit 135 and the resulting LLRs are stored in the first memory location 131 (i.e. WRITE command in FIG. 6). Still, at time T1, nothing is written nor stored in the second and third memory locations 132, 133 (i.e. hashed lines in FIG. 6). Indeed, the FEC decoding unit 137 cannot use at the same time, the LLRs associated with code block CB'_1 which are being concurrently generated by the HARQ combining unit 135. However, starting from time T2, the HARQ combining unit 135 and FEC decoding unit 137 are concurrently operated on soft bits associated with different blocks of the transmission signal. Namely, at time T2, code block CB'_2 is processed by the HARQ combining unit 135 and the resulting LLRs are stored in the second memory location 132 (i.e. WRITE command in FIG. 6) and not the first memory location 131. In fact, as explained earlier, the storing of the LLRs associated with a given code block is performed cyclically. Therefore, since the LLRs associated with code block CB'_1 were stored on the first memory location 131, then the LLRs associated with code block CB'_2 are stored on the second memory location 132. The circular/cyclical storing into one of the first, second and third memory locations 131, 132, 133 is performed by the HARQ combining unit 135 following a given scheme. For instance, in an embodiment the LLRs associated with code block CB'_2 may be stored on the third memory location 133 instead of being stored in the second memory location 132. At the same time, at time T2, code block CB'_1 is processed by the FEC decoding unit 137. Namely, the LLRs associated with code block CB'_1 are retrieved from the first memory location 131 (i.e. READ command in FIG. 6) in order to be converted into corresponding hard bits. In fact, as explained earlier, the retrieval by the FEC decoding unit 137 of the LLRs associated with a given code block is performed cyclically (e.g. in a circular fashion). Therefore, since at time T2, the currently cyclically selected memory location for storage is the second memory location 132, then the previous cyclically selected memory location for LLRs retrieval is the first memory location 131, as can be deduced from the above. The exemplary circular/cyclical data retrieval from one of the first, second and third memory locations 131, 132, 133 is performed by the FEC decoding unit 137 following the same scheme as used by the HARQ combining unit 135 for circular/cyclical storing. Hence, for instance, in an embodiment the LLRs associated with code block CB'_1 may be retrieved from the second memory location 132 instead of being retrieved from the first memory location 133 (i.e. hashed line in FIG. 6). Further, the FEC decoding unit 137 provides a CRC value of the hard bits associated with code block CB'_1. Later, when the CRC value is representative of a CRC failure, the processing unit 138 stores the LLRs associated with code block CB'_1, which are retrieved from the first memory location 131, into an external memory. Still, when the CRC value is representative of a CRC success, the processing unit 138 stores the hard bits associated with code block CB'_1, which are retrieved readily available at the level of the FEC decoding unit 137, into an external memory. In an embodiment, storing the LLRs into an external memory refers to accessing an external memory, such as a double data rate (DDR) memory attached to the demodulator 110 of the receiver 100, and storing the LLRs in such memory.

As can be readily understood by the skilled person, both the LLRs and hard bits associated with code block CB'_1 are available when the CRC value is determined. Hence, the effect obtained by the non-pipelined decoder 120 of document (1) is also achieved by the pipelined decoder 130.

Referring back to FIG. 6, at time T3, code block CB'_3 is processed by the HARQ combining unit 135 and the resulting LLRs are stored in the third memory location 133 (i.e. WRITE command in FIG. 6). At the same time, at time T3, code block CB'_2 is processed by the FEC decoding unit 137, as already explained above (i.e. READ command in FIG. 6). Hence, at time T3, all memory locations 131, 132, 133 are occupied. Further, at time T4, code block CB'_4 is processed by the HARQ combining unit 135 and the resulting LLRs are stored in the first memory location 131 (i.e. WRITE command in FIG. 6). Hence, at time T4, the content of the first memory location is overwritten by the LLRs associated with code block CB'_4. At the same time, at time T4, code block CB'_3 is processed by the FEC decoding unit 137, as already explained above (i.e. READ command in FIG. 6). Namely, the FEC decoding unit 137 provides a CRC value of the hard bits associated with code block CB'_2. Later, when the CRC value is representative of a CRC failure, the processing unit 138 stores the LLRs associated with code block CB'_2, which are retrieved from the second memory location 132, into an external memory. Still, when the CRC value is representative of a CRC success, the processing unit 138 stores the hard bits associated with code block CB'_2, which are retrieved readily available at the level of the FEC decoding unit 137, into an external memory. The skilled person readily understands that the configuration of the memory locations 131, 132, 133 at time T4 is almost the same the one occurring at time T1. In fact, at time T4 as at time T1, the HARQ combining unit 135 is writing to the first memory location 131. Therefore, it should be understood by the skilled person that the memory configuration at time T2 corresponds to the next memory configuration of the decoder 130, following the one at time T4.

Figure 7:
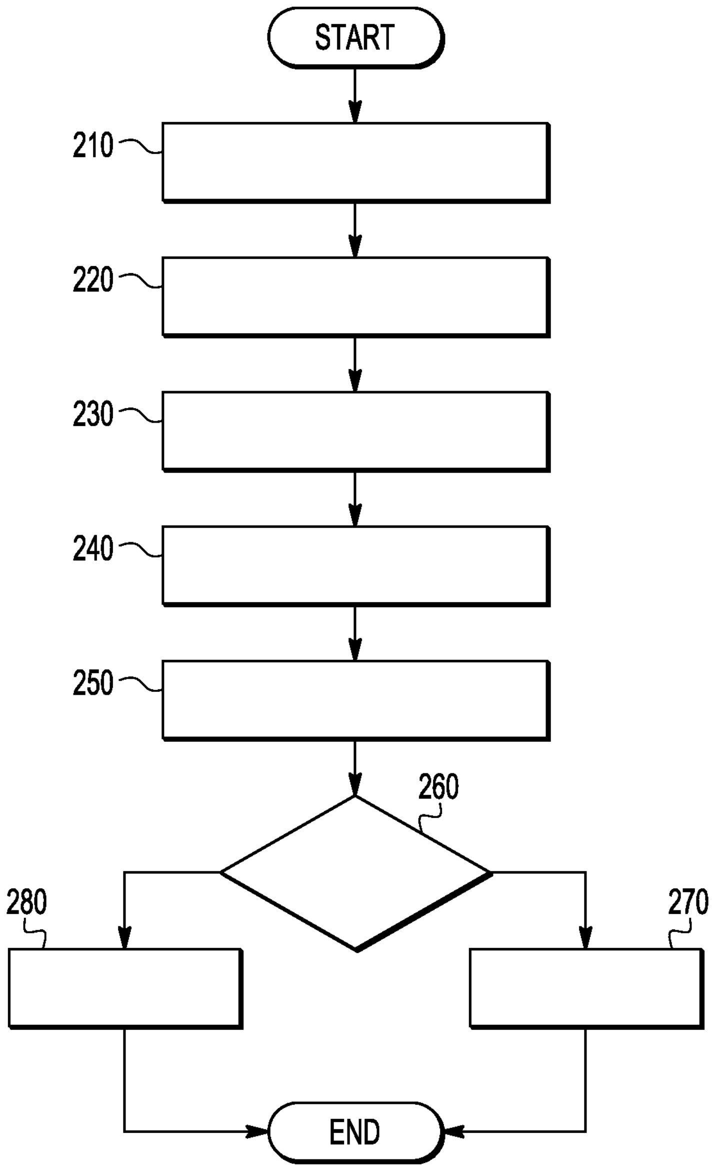
FIG. 7 is a schematic flow diagram of a method of storing of soft bits and hard bits associated with code blocks of a transmission according to an embodiment of the subject application.

Referring to FIG. 7, there is diagrammatically shown therein a schematic flow diagram of a method of storing soft bits and hard bits associated with code blocks of a transmission according to an embodiment of the subject application. In S210, it is provided first, second and third memory locations, each being arranged to store information associated with one received code block of the transmission. In S220, it is computed soft bits based on a received code block of the transmission. In S230, it is combined the soft bits with a retransmission of the received code block. In S240, it is stored the combined soft bits into a cyclically selected one of the first, second and third memory locations. In S250, it is decoded combined soft bits into hard bits based on the previous cyclically selected memory location. In S260, it is provided a cyclic redundancy check, CRC, value of the hard bits. In S270, when the CRC value is representative of a CRC failure, it is stored the combined soft bits of the previous cyclically selected memory location in an external memory. In S280, when the CRC value is representative of a CRC success, it is stored the hard bits in an external memory. Further, in FIG. 7, it is to be noted that the combining and decoding operations are concurrently performed on soft bits associated with different code blocks of the transmission, as already explained above.

It has now become clear that the proposed solution allows to reduce the amount of memory needed at the receiver level for soft bits and hard bits, in a pipelined decoder. Namely, with the solution of the subject application, both the LLRs (i.e. soft bits) and hard bits associated with a given code block are available when the CRC value is determined. Hence, the effect obtained by the non-pipelined decoder 120 of document (1) is also achieved by the pipelined decoder 130.

The above description elaborates embodiments of the subject application with regard to pipelined decoders in LTE communication systems, at the UE and/or eNodeB level. However, the teachings of the subject application may be readily contemplated for other communication systems such as UMTS, as long as where those other communication systems comprise receivers having pipelined decoders exhibiting the same characteristics as those described hereinbefore.

Of course, the above advantages are just examples, and these or other advantages may be achieved by the proposed solution. Further, the skilled person will appreciate that not all advantages stated above are necessarily achieved by embodiments described herein.

The proposed solution may also be implemented in a computer program product stored in a non-transitory computer-readable storage medium that stores computer-executable code which causes a processor computer to perform the operation of the pipelined decoder 130 and/or the exemplary method of FIG. 7 as illustrated in the foregoing description, for instance.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, multipoint-to-point telecommunication equipment and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

As used herein, the term "transmission" is intended to describe the process of sending, propagating and receiving an information signal over a physical point-to-point or point-to-multipoint transmission medium, either wired or wireless. Transmission typically involves the use of a digitized signal.

The term "wireless transmission" is intended to describe transmission in which electromagnetic waves carry a signal over part or the entire communication path. Wireless transmission may include, but is not limited to, Code Division Multiple Access (CDMA), Time Division Multiple Access (TDMA), Frequency Division Multiple Access (FDMA), Orthogonal FDMA (OFDMA), Single-Carrier FDMA (SC-FDMA). wireless local area networks (WLANs), broadcast networks. CDMA may include, but is not limited to, cdma2000, Universal Terrestrial Radio Access (UTRA). TDMA may include, but not limited to, technology such as Global System for Mobile Communications (GSM). An OFDMA system utilizes Orthogonal Frequency Division Multiplexing (OFDM) and sends modulation symbols in the frequency domain on orthogonal subcarriers, and may be implemented in technologies such as E-UTRA or E-UTRAN.

The term "radio subframe" or "wireless subframe" is intended to describe the basic time interval used for data transmission on the radio physical channel in wireless transmission. In 3GPP LTE, for example, a radio subframe is a numbered time interval of 1 ms duration.

The term "transport block" is intended to describe a unit of data that is mapped to a radio subframe. The size of the transport block may be determined by the governing radio interface protocol, it is therefore possible for a radio subframe to include one or more transport blocks. The transport block may have a fixed or variable size.

The term "code block" is intended to describe a sub-unit of a transport block. A code block is generally encoded individually using an error detection and/or error correcting encoding scheme. The encoding generates both error detection and error correction capability for the information to be transmitted. The number of code blocks within a transport block may vary, depending on the underlying protocol. For example, an LTE downlink transport block to be decoded at the handset would contain a maximum of 9 code blocks for a Category 2 User Equipment (UE) and a maximum of 50 code blocks for a Category 5 UE.

The term "downlink communication" is intended to describe transmission from a base station to a mobile station in a wireless communication system, and the term "uplink communication" is intended to describe transmission from a mobile station to a base station. The wireless communication system may generally include multiple base stations and multiple mobile stations, while a single base station often communicates with a set of mobile stations. Base stations and mobile stations may employ multiple antennas for transmitting and receiving radio wave signals. A mobile station may include, but not limited to, a PDA, laptop, or handheld device.

The term "forward error correction (FEC)" is intended to describe a method for error control in data transmission whereby the sender adds redundancy to the original information data bits using a predetermined algorithm, allowing the receiver to detect and correct errors. The original information data bits may or may not appear in the encoded output; codes that include the original information data bits in the output are systematic, while those that do not are non-systematic.

FEC can be categorized into block coding and convolutional coding. Using block coding, the encoder intersperses parity bits into the data sequence using a particular algebraic algorithm, and the decoder applies an inverse of the algebraic algorithm to identify and correct any errors caused by channel corruption. Block coding uses fixed-size blocks of bits of predetermined size. Examples of block code include Reed-Solomon coding, Golay, Bose-Chaudhuri-Hochquenghem (BCH) and Hamming coding.

Convolutional coding processes the incoming bits in streams rather than in blocks. The convolutional encoding of a bit is strongly influenced by the bits that preceded it. A convolutional decoder takes into account past bits when trying to estimate the most likely sequence of data that produced the received sequence of code bits.

One example of a convolutional decoder is the Viterbi algorithm. At each bit-interval, the Viterbi decoding algorithm compares the actual received coded bits with the coded bits that might have been generated for each possible memory-state transition. It chooses, based on metrics of similarity, the most likely sequence within a specific time frame.

Another example code that uses convolutional encoders is turbo coding, a scheme that combines two or more relatively simple convolutional codes and an interleaver to produce a block code that can approach the theoretical limit of channel capacity, as characterized by the so-called Shannon Limit. Turbo coding is used in CDMA2000 1× (TIA IS-2000), 1×EV-DO (TIA IS-856), as well as 3GPP LTE.

The term "automatic repeat request (ARQ)" is intended to describe an error correction scheme when a feedback channel is available. ARQ schemes typically operate with frames of information data. The frames include information bits and error-detecting bits, for example, CRC bits implemented with a cyclic code. A receiver uses the CRC bits to determine if any bit errors have occurred and, if so, requests a retransmission of the frame by sending a negative acknowledgment (NAK; i.e., an error indication) on the feedback channel. This is repeated until the frame is received without errors, in which case a positive acknowledgment (ACK) may be sent. The bit error rate (BER) of ARQ schemes is determined by the undetected error rate of the error detecting code and is usually selected to be very low.

The term "hybrid ARQ (HARQ)" is intended to describe a combination of FEC and ARQ in order to improve ARQ performance in communication systems with unreliable and time-varying channel conditions. Early versions of HARQ, Type-I HARQ, add both error detection, for example, CRC, and FEC information to each message prior to transmission. The receiver then uses the decoding algorithm corresponding to the FEC scheme to decode the error-correction code. The CRC is then computed to determine if the received data contains errors, if the channel quality is insufficient, and not all transmission errors can be corrected, the receiver will detect this situation using the error-detection code, and retransmission may be requested. Any retransmitted bits may be combined with the previously-received bits in order to improve the probability of a successful decoding. Conversely, if the channel quality is good enough, all transmission errors should be correctable, and the receiver can obtain the correct data block. The throughput of the Type-I HARQ is limited to a maximum value equal to the rate of the FEC code used.

In a more sophisticated form, Type-II HARQ adaptively varies the amount of additional error correcting bits sent to the receiver. Type-II HARQ initially transmits only information bits and CRC bits (although some error correcting bits may also be included). Subsequent retransmission requests entail incremental transmission of error correcting bits and/or the original systematic information bits. As for Type-I HARQ, each error correcting increment may optionally be combined with the previously received symbols by a decoder in the receiver. After each retransmission, the receiver is decoding a more powerful, lower rate code. Type-II HARQ systems have the ability to vary their throughput dynamically as channel conditions change.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A receiver for a wireless communication system, the receiver comprising:

first, second and third memory locations, each being arranged to store information associated with one received block of a transmission signal;

a Log-Likelihood Ratio, LLR, computing unit arranged to provide soft bits based on a received block of the transmission signal;

a Hybrid Automatic Repeat Request, HARQ, combining unit operably coupled to the LLR computation unit and to the first, second and third memory locations, the HARQ combining unit being arranged to:

combine the soft bits with a retransmission of the received block; and, store the combined soft bits into a cyclically selected one of the first, second and third memory locations;

a Forward Error Correction, FEC, decoding unit operably coupled to the first, second and third memory locations, the FEC decoding unit being arranged to:

decode combined soft bits into hard bits based on a previous cyclically selected memory location of the first, second and third memory locations; and, provide a cyclic redundancy check, CRC, value of the hard bits;

a processing unit, such as a processor, operably coupled to the FEC decoding unit and the first, second and third memory locations, the processing unit being arranged to store in an external memory:

the combined soft bits of the previously cyclically selected memory location when the CRC value is representative of a CRC failure; and, the hard bits when the CRC value is representative of a CRC success, wherein storage of the combined soft bits and the hard bits is deferred until after the CRC failure or CRC success, respectively, reducing the amount of memory required for the soft bits and the hard bits, wherein, in operation, the HARQ combining unit and FEC decoding unit concurrently operate on soft bits associated with different blocks of the transmission signal.

2. The receiver of claim 1, wherein cyclically accessing the first, second and third memory locations, for storing and decoding, is performed according to a given scheme.

3. The receiver of claim 1, wherein the communication channel is a Long Term Evolution, LTE, communication system.

4. The receiver of claim 3, wherein the block is any one of a: Physical Uplink Shared channel, PUSCH, or Physical Downlink Shared Channel, PDSCH, code block.

5. A pipelined decoder for storing soft bits and hard bits associated with blocks of a transmission, the pipelined decoder comprising:

an input for providing first, second and third memory locations, each being arranged to store information associated with one received block of the transmission;

a logic circuit for computing soft bits based on a received block of the transmission;

a logic circuit for combining the soft bits with a retransmission of the received block;

a logic circuit for storing the combined soft bits into a cyclically selected one of the first, second and third memory locations;

a decoder for decoding combined soft bits into hard bits based on the previous cyclically selected memory location;

a Forward Error Correction, FEC, decoding unit for providing a cyclic redundancy check, CRC, value of the hard bits;

an output for storing in an external memory:

the combined soft bits of the previous cyclically selected memory location when the CRC value is representative of a CRC failure; and, the hard bits when the CRC value is representative of a CRC success, wherein storage of the combined soft bits and the hard bits is deferred until after the CRC failure or CRC success, respectively, reducing the amount of memory required for the soft bits and the hard bits, wherein, in operation, the logic circuit for combining and the decoder are concurrently operated on soft bits associated with different blocks of the transmission.

6. The pipelined decoder of claim 5, wherein cyclically accessing the first, second and third memory locations, for storing and decoding, is performed according to a given scheme.

7. The pipelined decoder of claim 5, wherein the communication channel is a Long Term Evolution, LTE, communication system.

8. The pipelined decoder of claim 7, wherein the block is any one of a: Physical Uplink Shared channel, PUSCH, or Physical Downlink Shared Channel, PDSCH, code block.

9. A method of storing soft bits and hard bits associated with blocks of a transmission, the method comprising:

providing first, second and third memory locations, each being arranged to store information associated with one received block of the transmission;

computing soft bits based on a received block of the transmission;

combining the soft bits with a retransmission of the received block;

storing the combined soft bits into a cyclically selected one of the first, second and third memory locations;

decoding combined soft bits into hard bits based on a previous cyclically selected memory location of the first, second and third memory locations;

providing a cyclic redundancy check, CRC, value of the hard bits;

storing in an external memory:

the combined soft bits of the previous cyclically selected memory location when the CRC value is representative of a CRC failure; and, the hard bits when the CRC value is representative of a CRC success, wherein storage of the combined soft bits and the hard bits is deferred until after the CRC failure or CRC success, respectively, reducing the amount of memory required for the soft bits and the hard bits, wherein, combining and decoding operations are concurrently performed on soft bits associated with different blocks of the transmission.

10. The method of claim 9 wherein, cyclically accessing the first, second and third memory locations, for storing and decoding, is performed according to a given scheme.

11. The method of claim 9, wherein the communication channel is a Long Term Evolution, LTE, communication system.

12. The method of claim 11, wherein the block is any one of a: Physical Uplink Shared channel, PUSCH, or Physical Downlink Shared Channel, PDSCH, code block.

13. A computer program product stored in a non-transitory computer-readable storage medium that stores computer-executable code for storing soft bits associated with blocks of a transmission, the computer-executable process causing a processor computer to perform the method according to claim 9.

14. The receiver of claim 2, wherein the communication channel is a Long Term Evolution, LTE, communication system.

15. The pipelined decoder of claim 6, wherein the communication channel is a Long Term Evolution, LTE, communication system.

16. The method of claim 10, wherein the communication channel is a Long Term Evolution, LTE, communication system.

* * * * *